(12) United States Patent
Maskell et al.

(10) Patent No.: US 6,247,489 B1
(45) Date of Patent: Jun. 19, 2001

(54) CHECK VALVE

(75) Inventors: Bruce W. Maskell, Fairfield; Gene L. Pecci, Novato, both of CA (US)

(73) Assignee: Jandy Industries Inc, Novato, CA (US)

( * ) Notice: Subject to any disclaimer, the term of this patent is extended or adjusted under 35 U.S.C. 154(b) by 0 days.

(21) Appl. No.: 09/078,224

(22) Filed: May 13, 1998

(51) Int. Cl.[7] .................................................. F16K 27/12
(52) U.S. Cl. .................................. 137/269.5; 137/527.4; 137/559
(58) Field of Search ............................... 137/269.5, 271, 137/527, 527.4, 559

(56) References Cited

U.S. PATENT DOCUMENTS

| | | | |
|---|---|---|---|
| 2,589,176 | * | 3/1952 | Wheatley ........................ 137/269.5 |
| 3,075,547 | * | 1/1963 | Scaramucci ................... 137/527.4 X |
| 4,481,976 | | 11/1984 | Cyphelly . |
| 4,503,881 | * | 3/1985 | Vecchio ........................... 137/559 X |
| 5,148,828 | | 9/1992 | Farnham . |
| 5,671,769 | * | 9/1997 | Booth et al. ...................... 137/269.5 |

FOREIGN PATENT DOCUMENTS

682591  * 11/1952 (GB) .............................. 137/527.4

* cited by examiner

*Primary Examiner*—Kevin Lee
(74) *Attorney, Agent, or Firm*—Robert J. Pugh; Patrick J. Viccaro

(57) ABSTRACT

A valve is disclosed. The valve has a housing that defines a central area and has at least two flow ports therethrough. A cover is provided that has a flapper assembly pivotally attached thereto. The cover is removably attachable to the housing in a plurality of orientations to selectively orient the flapper assembly adjacent any one of the ports such that fluid is permitted to flow into the central area of the housing through the adjacent port. The flapper assembly prevents the fluid from flowing back out of the central area through the adjacent port. The cover may have a transparent portion to permit the flapper assembly to be viewed and inspected during operation. A double seal arrangement is also disclosed.

20 Claims, 8 Drawing Sheets

CHECK VALVE

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to valves and, more particularly, to check valves for use in controlling flow of fluids.

2. Description of the Invention Background

Over the years, a variety of different valves have been developed for controlling fluid flow through pipelines. Most valves, regardless of type, comprise a housing member that operably supports a flow control member therein. The housing typically has two or more ports that are constructed for attachment to corresponding portions of pipelines. Some ports are provided with threaded connections, while others utilize a "slip fit" connection wherein a section of pipeline is slidably received in a socket formed in the valve housing. The pipe is typically retained within the socket by an appropriate attachment medium or adhesive. For example, the pipe may be affixed to the socket by welding, soldering, gluing, etc.

The flow control characteristics afforded by a valve are generally dependent upon the type of flow control member employed. In many pipeline applications, it is desirable to utilize valves that only permit fluid to flow in a single direction. In those instances, valves known as "check valves" are usually employed. For example, many municipal water authorities require each user to employ a device for preventing fluid from their respective plumbing system from flowing into the potable water supply. When water pressure in a potable water system is unusually low, or if high pressure occurs in the user's plumbing system, reverse flow from the user's plumbing system into the potable water supply is possible. Such reverse flow or "back flow" could contaminate the water supply. In these applications, check valves are typically attached at or near the location where the consumer's plumbing system connects to the common supply line. Of course, the use of check valves is not limited to drinking water applications. Check valves are also employed in a variety of other residential and industrial applications where such unidirectional flow characteristics are desirable.

A number of differently configured check valves exist for maintaining unidirectional fluid flow within a pipeline system. One type of check valve, known as a "ball" check valve, employs a ball-shaped flow control member that is movably supported within the valve housing and is adapted to sealingly engage a seat adjacent one of the ports. When fluid flows into the valve housing in one direction, the ball is forced out of contact with the seat and the fluid is permitted to pass through the valve. If the fluid attempts to flow through the valve in an opposite direction, the fluid forces the ball into contact with the seat to thereby prevent the fluid from flowing back through the valve.

Another type of check valve, known as a "swing" check valve employs a disc that is pivotally attached to the valve housing and is adapted to sealingly engage a valve seat that surrounds one of the valve ports. When fluid flows through the housing in a desired direction, the disc is forced out of contact with the seat by the fluid and the fluid is permitted to flow through the valve. Should the fluid attempt to flow back through the valve, however, the back-flowing fluid will pivot the disc into contact with the seat to seal off that port. Thus, the fluid is prevented from flowing in reverse direction through the valve.

While such valves can effectively limit flow to a single direction through a pipeline, such prior check valve designs have various shortcomings. For example, if the valve disc is not achieving a seal with the seat or the disc is otherwise damaged or it becomes desirable to limit the flow of fluid within a pipeline in another direction, the prior check valve arrangements must be detached from the pipeline and a new valve must be installed. To install a new valve, the flow must be discontinued and the fluid is typically drained from the pipeline. If a hazardous fluid is being handled, special precautions must be taken to prevent environmental contamination and injury to the personnel installing the valve. If the old valve has been installed by welding or by gluing, the old valve usually must be cut from the pipeline. Often times when a valve is cut from the pipeline, an additional section of pipeline must be added to compensate for the section(s) of pipe that were removed with the old valve. The reader will readily appreciate that such activities can be very time consuming and costly in the form of labor expenses and process downtime, depending upon the application.

Also, in many pipeline arrangements, it is desirable to monitor the performance of the valve disc during use to determine whether it is functioning adequately. In prior valve designs, however, the entire valve must be removed from the pipeline or a cover member must be detached from the valve housing to permit the disc to be viewed. Thus, personnel are unable to view the disc when fluid is flowing through the valve or when the disc is seated in a sealing orientation. In addition, many check valves employ a single seal arrangement that can result in an inadequate seal.

Thus, there is a need for a check valve that has a flow control member that can be repositioned within the valve housing without removing the valve from the pipeline in which it is installed.

There is a further need for a check valve that has a seal disc therein that can be inspected while in a sealing position and when fluid is flowing through the valve.

There is still another need for a check valve that has an improved seal arrangement.

Another need exists for a check valve disc arrangement that has the above-mentioned characteristics that can be retrofitted into other valve bodies without removing the valve body from a pipeline.

Yet another need exists for a check valve with the above-mentioned characteristics that has two, three, or four or more ports therein.

SUMMARY OF THE INVENTION

In accordance with a particularly preferred form of the present invention, there is provided a valve that comprises a housing that defines a central area and has at least two flow ports therethrough. The valve also includes a cover that has a flapper assembly pivotally attached thereto. The cover is removably attachable to the housing in a plurality of orientations to selectively orient the flapper assembly adjacent any one of the ports such that fluid is permitted to flow into the central area of the housing through the adjacent port and the flapper assembly prevents the fluid from flowing out of the central area back through the adjacent port.

Another embodiment comprises a check valve that includes a housing that defines a central area. The housing also has a first port that lies along a first flow axis. The first port is attachable to a first fluid-receiving conduit. The housing also includes a second port that lies along a second flow axis that is substantially coaxial with the first flow axis and is attachable to a second fluid-receiving conduit. The valve also preferably comprises a transparent cover that has a flapper assembly pivotally attached thereto. The cover is attachable to the housing in a plurality of positions to selectively orient the flapper assembly adjacent either of the first and second ports such that a fluid is permitted to flow through the adjacent port into the central area and the flapper assembly prevents the fluid from flowing out of the central area through the adjacent port.

Another embodiment of the present invention comprises a check valve that includes a housing that defines a central area and has a first port that lies along a first flow axis and is attachable to a first fluid-receiving conduit. The housing also includes a second port that lies along a second flow axis that is substantially perpendicular to the first flow axis and is attachable to a second fluid-receiving conduit. A transparent cover having a flapper assembly pivotally attached thereto. The cover is removably attachable to the housing in a plurality of positions to selectively orient the flapper assembly adjacent any one of the first and second ports such that a fluid is permitted to flow through the adjacent port into the central area and the flapper assembly prevents the fluid from flowing out of the central area back through the adjacent port.

Another embodiment of the present invention comprises a check valve that includes a housing that defines a central area and that has a first port therethrough that lies along a first flow axis. The first port is attachable to a first fluid-receiving conduit. The housing also has a second port therethrough that is coaxially aligned on the first flow axis and that is attachable to a second fluid-receiving conduit. The housing also has a third port that lies along a second flow axis that is substantially perpendicular to the first flow axis and is attachable to a third fluid-receiving conduit. The valve further comprises a transparent cover that has a flapper assembly pivotally attached thereto. The cover is attachable to the housing in a plurality of positions to selectively orient the flapper assembly adjacent any one of the first, second and third ports such that fluid is permitted to flow into the central area through the adjacent port and the flapper assembly prevents fluid from flowing back out of the central area through the adjacent port.

Yet another embodiment of the present invention comprises a check valve that has a housing that defines a central area and has four ports therein. The valve also includes a transparent cover that has a flapper assembly that is pivotally attached thereto. The cover is attachable to the housing in a plurality of positions to selectively orient the flapper assembly adjacent any one of the ports such that the flapper assembly permits fluid to flow into the central area through the adjacent port and prevents fluid from flowing from the central area back through the adjacent port.

The present invention may also comprise a flow control member for a check valve that has a housing and that has at least two ports therein. In a preferred form, the flow control member comprised a diverter that is pivotally supportable within the check valve housing adjacent to one of the ports therein. The flow control member also comprises a seal that is attached to the diverter and has a first inner seal lip that extends around a perimeter of the diverter such that the first inner seal lip is supported thereby for sealing engagement with the check valve housing. The seal further comprises an outer seal lip that is parallel to the inner seal lip and is cantilevered therefrom.

The present invention may also comprise a method for selectively permitting a fluid to flow through a conduit in any one of two directions. In a preferred form, the method may comprise providing a check valve having a housing that has a first and second port therein and a cover that has a flapper assembly pivotally attached thereto. The cover may be selectively attached to the housing in a plurality of orientations to orient the flapper assembly adjacent either of the first and second ports. The method may also include connecting the first and second ports to corresponding sections of conduit and affixing the cover to the housing such that the flapper assembly is adjacent to the first flow port. In addition, the method may include flowing a fluid through the conduit and into the first port in a first direction such that the flapper assembly prevents the fluid from flowing though the first port in a direction opposite to the first direction.

It is a feature of the present invention to provide a check valve that is easy to manufacture and install.

It is another feature of the present invention to provide a check valve that has a fluid diverter that can be observed during operation.

Yet another feature of the present invention is to provide a multi-ported check valve that has a flow diverter that can be selectively oriented adjacent any one of the ports without removing the valve from the pipeline in which it is installed.

Still another feature of the present invention is to provide a flow control member for a valve that can establish a double seal with a valve seat or a portion of a valve housing.

Another feature of the present invention is to provide a check valve that is relatively easy to maintain and repair.

Accordingly, the present invention provides solutions to the shortcomings of prior check valve and valve seal arrangements. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein.

DETAILED DESCRIPTION OF THE PREFERRED EMBODIMENTS

Figure 2:
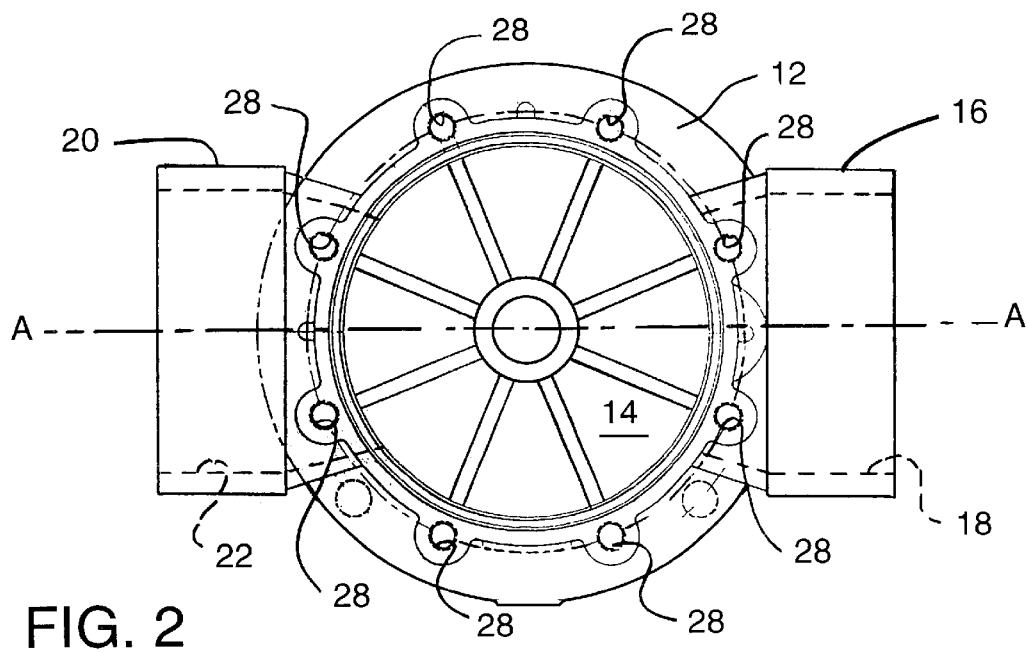
FIG. 2 is a plan view of the housing portion of the check valve of FIG. 1.

Referring now to the drawings for the purposes of illustrating the present preferred embodiments of the invention only and not for the purposes of limiting the same, the Figures show a check valve 10 that is adapted to be installed in a pipeline 11 that includes sections of conduit (13, 15). Check valve 10 preferably has a housing 12 and a cover 30 that is removably attachable to the housing 12. More particularly and with reference to FIGS. 1–3, housing 12 defines a central area 14 and may include two coupling portions (16, 20) that define ports (18, 22), respectively, within housing 12. In this embodiment, ports (18, 22) are coaxially aligned along flow axis A—A. Housing member is preferably fabricated from a thermoplastic material such as, for example, CPVC. However, housing 12 may be fabricated from a myriad of other materials such as steel, iron, stainless steel, etc. Coupling members (16, 20) are adapted to facilitate attachment of the valve 10 to portions of conduit (13, 15), respectively that comprise the pipeline 11. In this embodiment, coupling members (16, 20) comprise slip fit couplers and the conduits (13, 15) are retained in their respective coupling member (24, 26) by an appropriate attachment medium, such as an adhesive manufactured by IPS Corporation of Gardena, California 90248. However, conduits (13, 15) may be attached to coupling members (26, 20) by welding or by threaded or compression connections.

Figure 3:
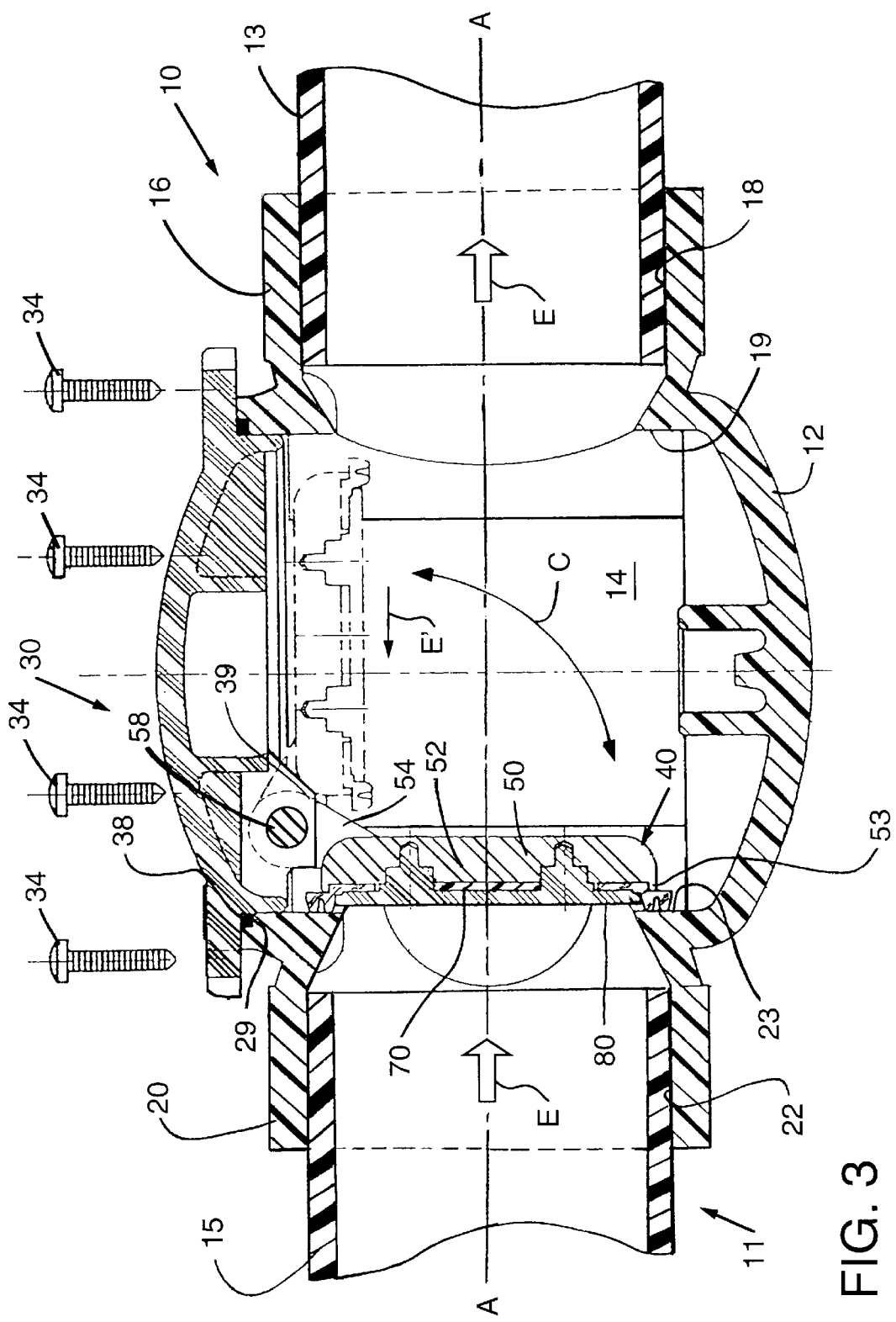
FIG. 3 is a cross-sectional elevational view of the check valve installation of FIG. 1 taken along line III—III in FIG. 1.
Figure 4:
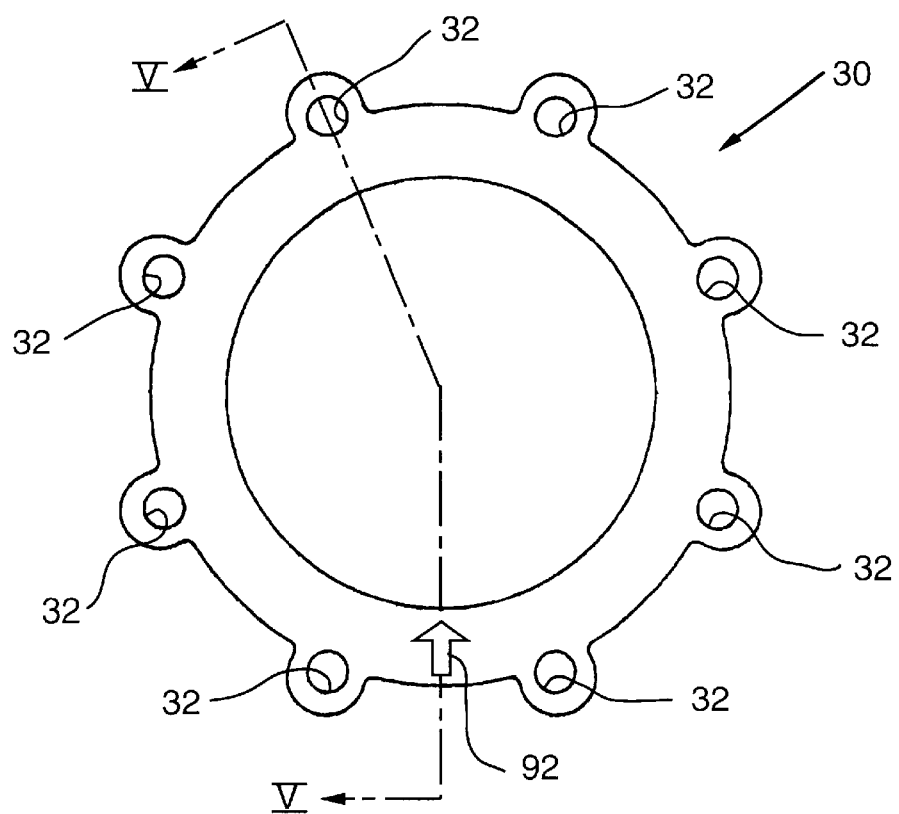
FIG. 4 is a plan view of a cover of the present invention.
Figure 5:
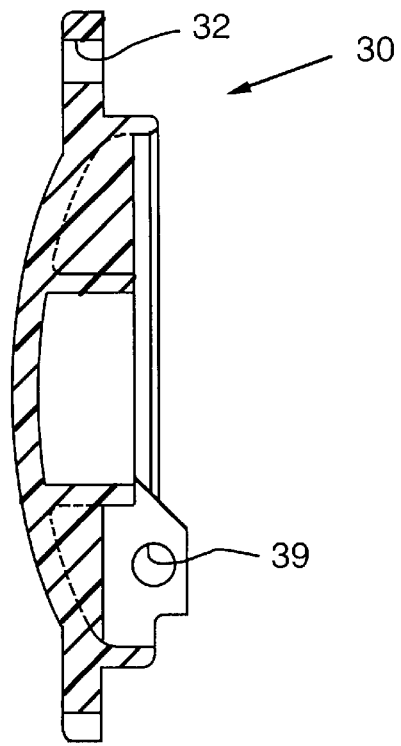
FIG. 5 is a cross-sectional view of the cover of FIG. 4 taken along line V—V in FIG. 4.
Figure 6:
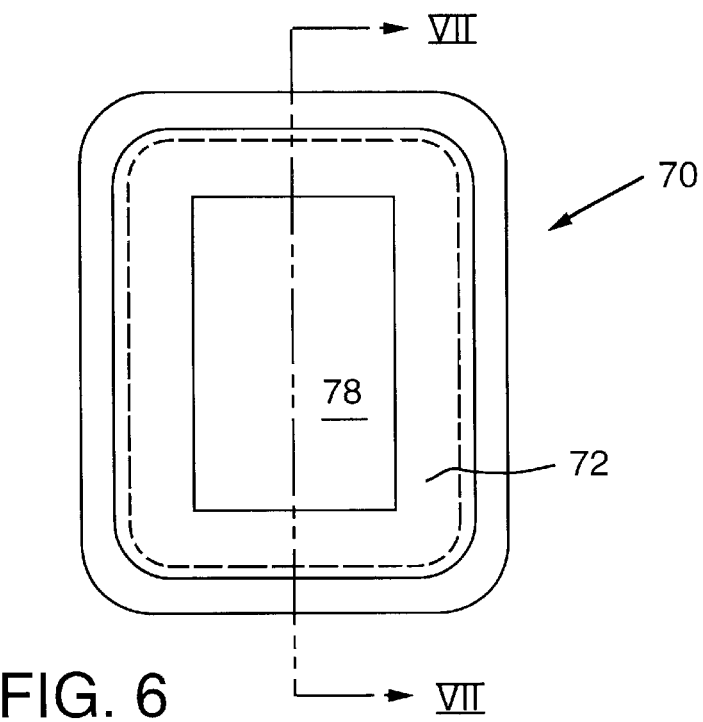
FIG. 6 is a bottom view of a seal of the present invention.
Figure 7:
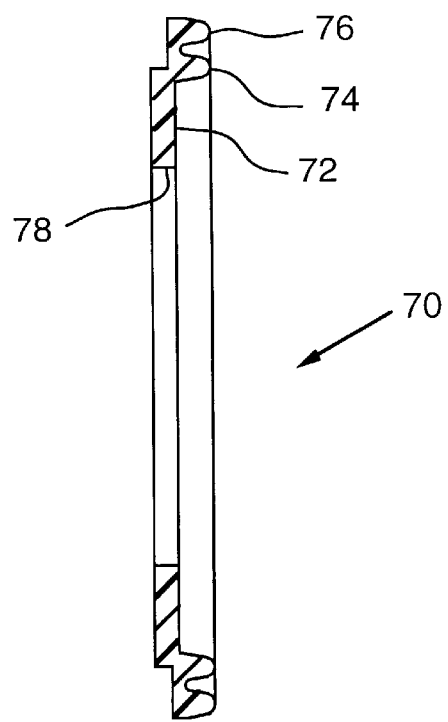
FIG. 7 is a cross-sectional view of the seal of FIG. 6 taken along line VII—VII of FIG. 6.

FIGS. 4 and 5 illustrate a cover member 30 of the present invention. In a preferred embodiment, cover member 30 is fabricated from a commercially available clear polymeric material such as acrylic that would permit viewing of the central area 14 when the cover member 30 is affixed to the housing 12. In an alternative embodiment, cover member 30 may be fabricated from an opaque material and provided with a "viewing window" that enables the central area to be observed when the cover 30 is attached to the housing 12. In addition, the skilled artisan will appreciate that cover member 30 could be fabricated from a variety of other materials such as other thermoplastic or thermoset plastic materials or iron, steel, stainless steel, etc. without a viewing window or with a viewing area therein. As can be seen in FIG. 2, housing member 12 is preferably provided with a plurality of threaded holes 28 therein that enable the cap member 30 to be attached to the housing in a plurality of positions by cap screws 34. Cap screws 34 extend through holes 32 in the cover member 30 to be received in the threaded holes 28. That is, cover member 30 can be rotated relative to the housing member until the holes 32 align with the threaded holes 28 in the housing to facilitate reattachment of the cover member 30 to the housing 12. In a preferred embodiment, to achieve a fluid-tight seal between the housing 12 and cover member 30, an O-ring 38 is received within a groove 29 in housing 12. See FIG. 3.

Cover member 30 also has a flapper assembly 40 pivotally attached thereto that, as will be discussed in further detail below, can be oriented relative to one of the ports (18, 22). Flapper assembly 40 may comprise a diverter member 50 that is equipped with a seal 70. The diverter 50 has a body portion 52 and two attachment arms 54 that have coaxially-aligned, pin-receiving bores 56 therethrough. As can be seen in FIG. 3, the diverter 50 is pivotally attached to the cover member 30 by coaxially aligning bores 56 with pin-receiving bores 39 provided in the cover member 30. A commercially available pin 58 is inserted through the bores 56 and bores 39 to enable the diverter 50 to pivot about a pivot axis D-D. See FIG. 1. Thus, the flapper assembly 40 can pivot in the manner illustrated by arrow "C" in FIG. 3. Of course, flapper assembly 40 could be attached to the cover member 30 by other appropriate attachment arrangements.

Figure 8:
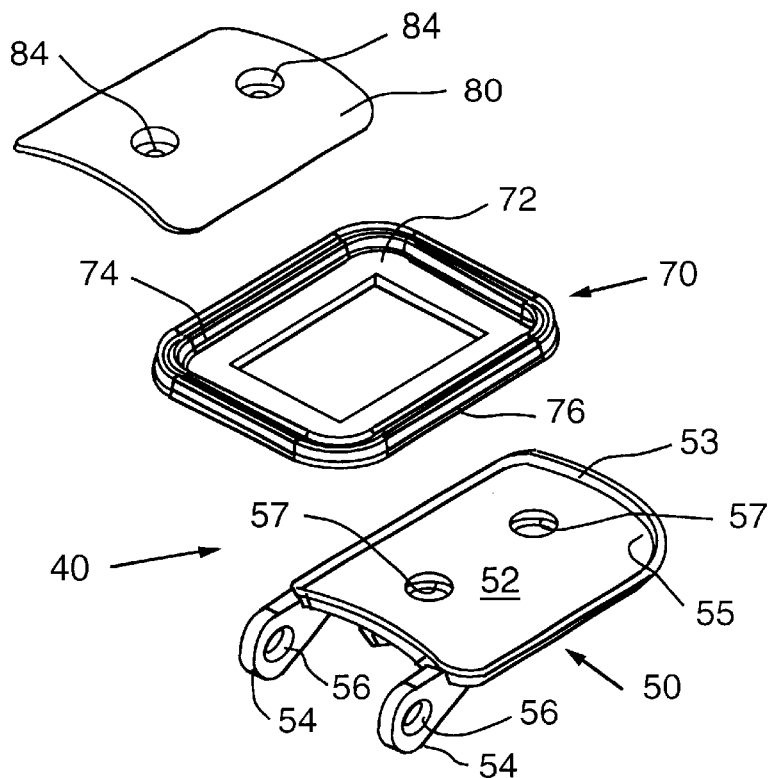
FIG. 8 is an exploded assembly view of a flapper assembly of the present invention viewed from the top.
Figure 9:
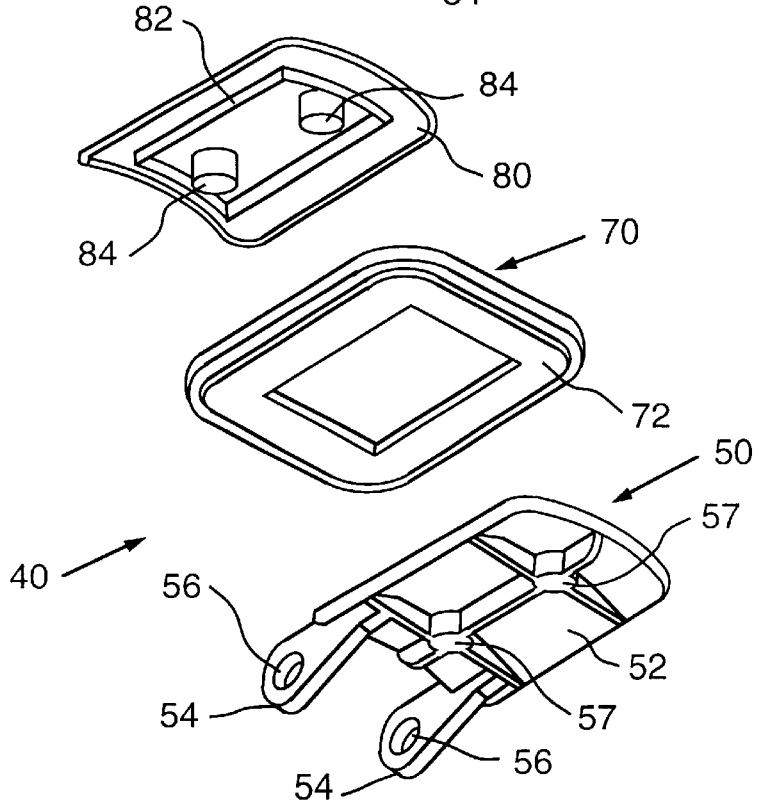
FIG. 9 is an exploded assembly view of the flapper assembly of FIG. 8 viewed from the bottom.

As shown in FIGS. 8–9, diverter 50 preferably has an upstanding rim 53 that extends around the perimeter of the body portion 52 to define a seal-receiving recess 55 therein. Two pin-receiving cavities 57 are also preferably provided in the body portion 52 as shown in FIGS. 8 and 9. Seal 70 preferably has a body portion 72 that is sized to be received in the seal-receiving recess 55. Seal 70 is also preferably formed with a first lip portion 74 that extends around the perimeter of the body portion 72. In a preferred embodiment, seal 70 is also formed with a second lip portion 76 that is parallel with the first lip portion 74.

Seal 70 is preferably attached to the diverter by a seal retainer plate 80. As can be seen in FIGS. 6–9, an opening 78 is provided through the body portion 72 of the seal 70. The seal retainer plate 80 has an underside that preferably has a centrally disposed ridge 82 that is adapted to be received within the opening 78 in the seal body 72. See FIG. 9. In addition, two bosses or pins 84 protrude from the underside of the seal retainer plate 80 for receipt in the corresponding cavities 57. Thus, in a preferred embodiment, the seal 70 is placed in the seal-receiving cavity 55 in the diverter 50 and is retained therein by inserting the pins 84 in the seal retainer plate 80 into the pin-receiving cavities 57. In a preferred embodiment, the diverter 50 and the seal retainer plate 80 are fabricated from thirty percent glass-filled Noryl and the pins 84 are retained within the cavities 57 by ultrasonic welding. The skilled artisan will appreciate, however, that the those elements may be fabricated from other suitable materials and that seal 70 could be attached to the diverter 50 by various other means.

Preferably, when the seal 70 is affixed to the diffuser 50, the first lip is supported by the rim 53 and the second lip 76 is cantilevered therefrom. When the lips (74, 76) are brought into contact with one of the seats (19, 23), a fluid-tight seal between the flapper assembly 40 and the seat (19, 23) to which it contacts is achieved. The skilled artisan will appreciate that such "double seal" arrangement essentially provides a more effective way to establish a seal between the flapper assembly 40 and the adjacent seat (19, 23). The skilled artisan will also appreciate that the other types of seals and flapper arrangements could be employed.

Figure 1:
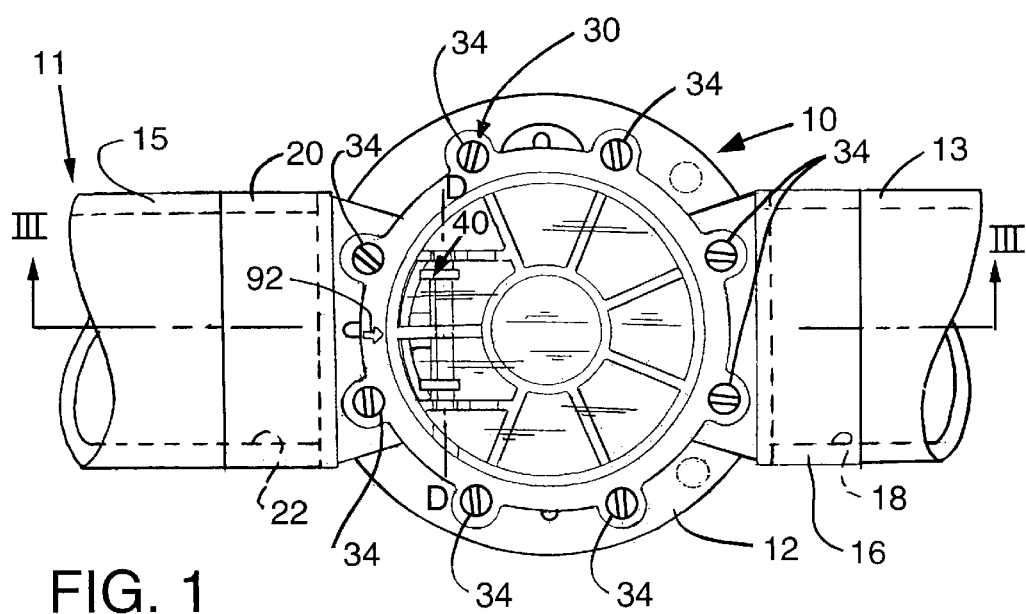
FIG. 1 is a plan view of a check valve of the present invention installed in a pipeline.
Figure 11:
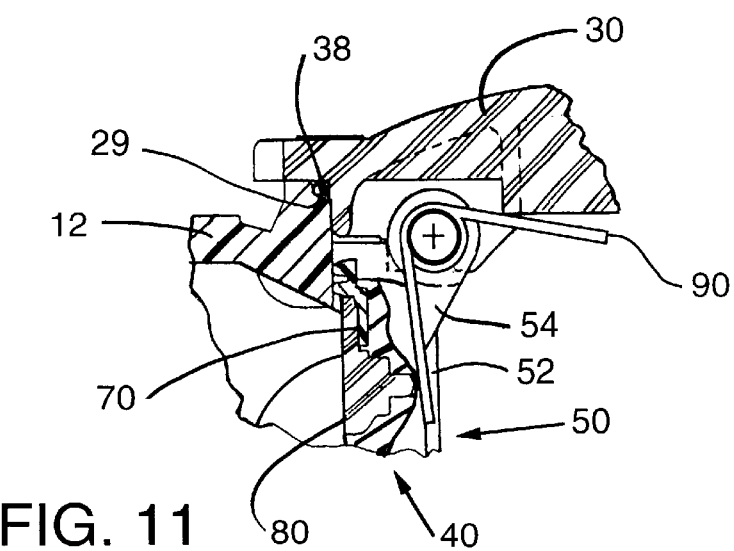
FIG. 11 is a partial cross-sectional assembly view of the flapper assembly of FIG. 10 attached to a cover that is attached to a housing of the present invention.
Figure 10:
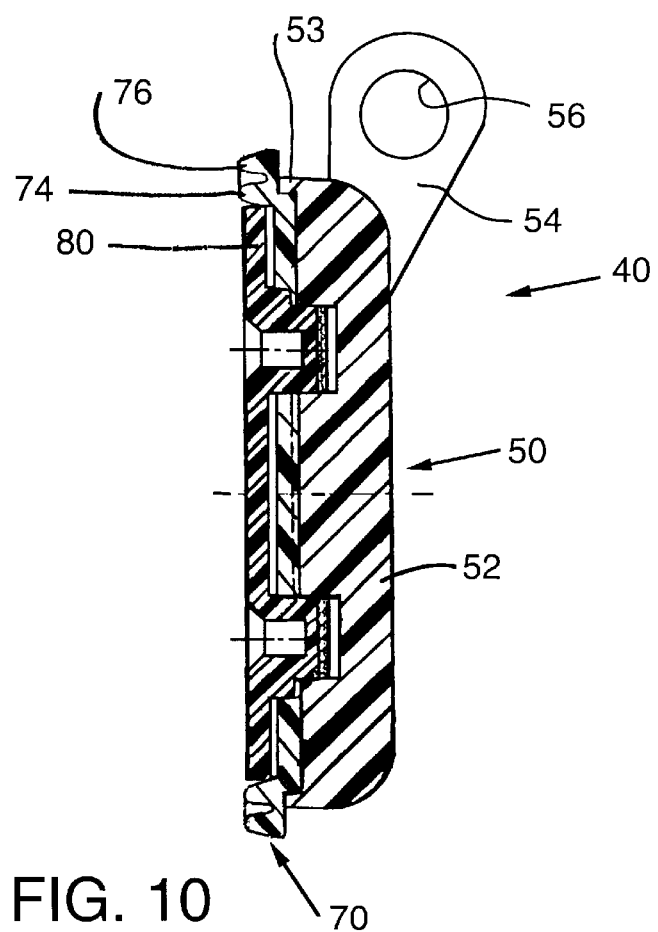
FIG. 10 is a cross-sectional view of a flapper assembly of the present invention.

As can be seen in FIGS. 1 and 11, the flapper assembly 40 is pinned to the housing 12 and a biasing member 90, preferably in the form of a spring, is positioned between the cover member 30 and the flapper assembly 40 to bias the flapper assembly 40 into sealing engagement with one of the seats (19, 23) in a manner discussed below. More particularly, after the check valve 10 has been installed in a pipeline 11 in the manner discussed above, the user should ascertain the desired flow direction through pipe line (represented by arrows "E") in FIG. 3. Once the flow direction has been determined, the cover member 30 is attached to the housing 12 such that the flapper assembly 40 is positioned adjacent port 22. The cover member 30 is then secured in place by cap screws 34. Thus, when a fluid flows through the conduit 15 and enters port 22, it contacts the flapper assembly 40 and pivots it to an open position (shown in phantom lines in FIG. 3) wherein fluid is permitted to enter the central area 14 of the valve 10 and exit through the other port 18. However, should the fluid flowing in the "E" direction be discontinued or otherwise attempt to flow out from the central area 14 through the port 22 (designated by "E'" in FIG. 3), the flapper assembly 40 is pivoted by virtue of contact with such fluid and by the biasing force of the spring 90 serves to bias the first and second lips (74, 76) of seal 70 into contact with the seat 23 to achieve a fluid-tight seal therebetween. Therefore, the check vale 10 permits unidirectional flow in the "E" direction. See Figure. 3.

Those of ordinary skill in the art will appreciate that the transparent cover member 30 permits the flapper assembly 40 to be viewed while fluid is passing through the valve 10 or is being blocked by the flapper assembly 40. Thus, the operation of the flapper assembly 40 can be observed during operation and without removing the cover member 30 from the housing or removing the valve 10 from the pipeline 11. Such arrangement also permits the flapper assembly 40 to be quickly replaced should it or the seal 70 become damaged without the need to remove the entire valve 10 from the pipeline 11. In addition, should it become desirable to change the direction of flow through the check valve 10, the cover member 30 may be detached from the housing 12 and reoriented thereon to position the flapper assembly 40 adjacent to the port 18. For safety purposes, it is recommended that the pressure generated by the fluid within the pipeline 11 and the check valve 10 be relieved by draining the pipeline, etc. prior to removing the cover member 30. After the cover member 30 has been so oriented on the housing 12 such that the flapper assembly 40 is adjacent the port 18, the cover member 30 is reattached to the housing 12 by cap screws 34. Thereafter, flow of fluid in the E' direction may be commenced. To assist in determining the direction of fluid flowing through the valve, an identification arrow 92 is preferably provided on cover member 30. See FIGS. 1 and 4.

Figure 12:
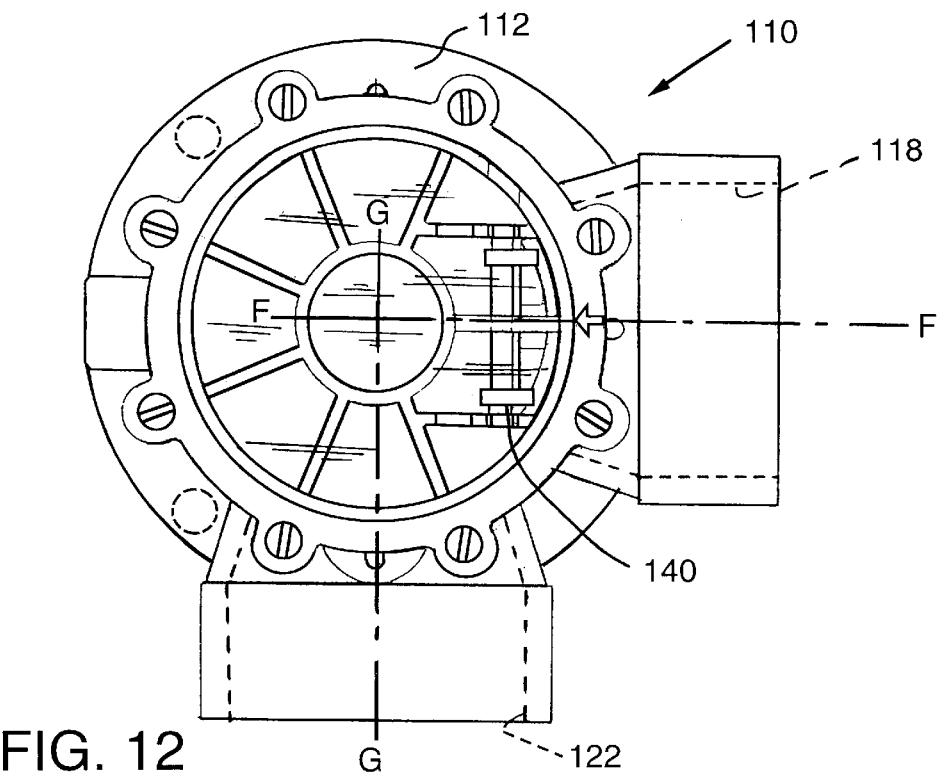
FIG. 12 is a plan view of another check valve of the present invention.

The skilled artisan will appreciate from the foregoing discussion that the unique and novel aspects of the present invention make it well-suited for even more pipeline applications. For example, FIG. 12 depicts another valve 110 that is constructed in the manner described above. However, in this embodiment, a port 118 in housing 112 lies along a first flow axis F-F and port 122 lies along a second flow axis G-G that intersects the first flow axis F-F. In a preferred embodiment, the second flow axis G-G may be substantially perpendicular to the first flow axis F-F. In this embodiment, the cover 130 can be attached to the housing 112 in a plurality of orientations such that the flapper assembly 140 can be selectively oriented adjacent to any of the ports (118, 122) to achieve the desired flow characteristics.

Figure 13:
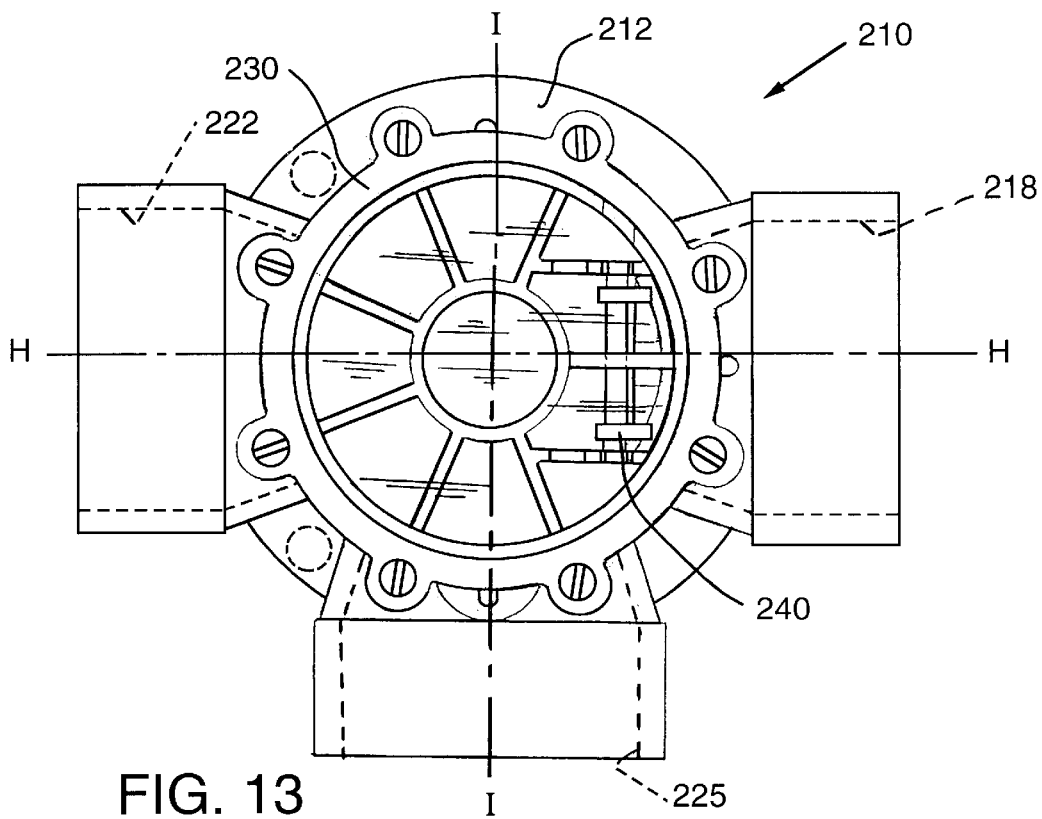
FIG. 13 is a plan view of another check valve of the present invention.

In another embodiment, the valve may be provided with three ports as shown in FIG. 13. As can be seen in that Figure, valve 210 has a housing 212 that has ports (218, 222, 225) therein. Ports (218, 222) are coaxially aligned along a first flow axis H-H and port 225 is aligned along a second flow axis I-I that intersects the first flow axis. Valve 210 is otherwise identical to valve 10 described above. Those of ordinary skill in the art will appreciate that the cover 230 can be attached to the housing 212 in a plurality of orientations such that the flapper assembly 240 can be oriented adjacent to any of the ports (218, 222, 225) to achieve the desired flow characteristics.

Figure 14:
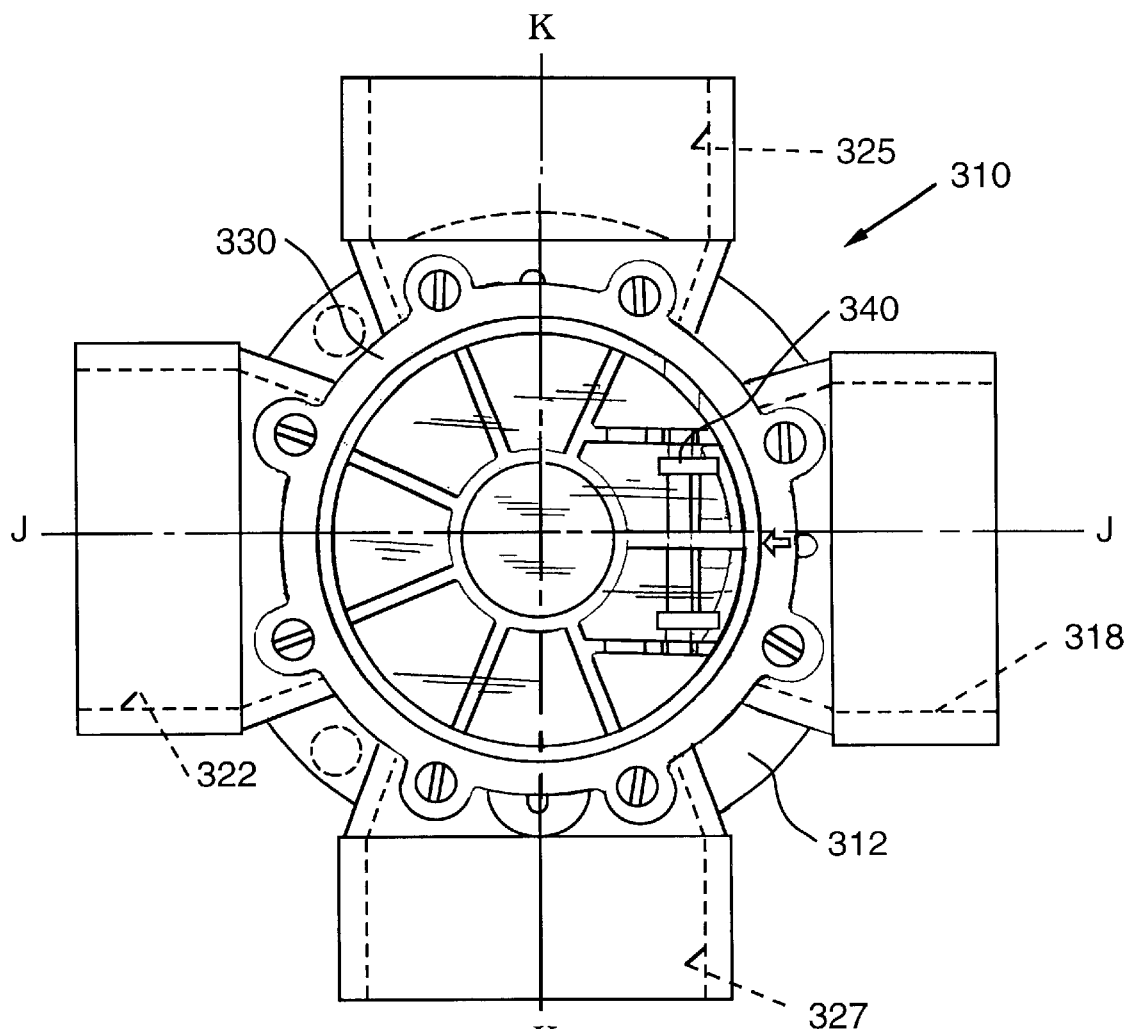
FIG. 14 is a plan view of another check valve of the present invention.

FIG. 14 illustrates a valve 310 that has an housing 312 that has ports (318, 322, 325, 327) therein. Ports (318, 322) are coaxially aligned along a first flow axis J-J and ports (325, 327) are coaxially aligned along a second flow axis K-K that intersects the first flow axis J-J. Valve 310 is otherwise identical in construction to the valve 10 described above. It will therefore be appreciated that the cover 330 thereof can be selectively attached to the housing 312 in a plurality of orientations such that the flapper assembly 340 can be oriented adjacent to any of the ports (318, 322, 325, 327).

Thus, from the foregoing discussion, it is apparent that the present many of the problems encountered by prior check valves. However, those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A valve, comprising:
    a housing defining a central area and having at least two flow ports therethrough; and
    a cover having a flapper assembly pivotally attached thereto, said cover being removably attachable to said housing in a plurality of orientations to selectively orient said flapper assembly adjacent any one of said ports such that fluid is permitted to flow into said central area of said housing through said adjacent port and said flapper assembly prevents said fluid from flowing out of said central area through said adjacent port, wherein said flapper assembly comprises:
    a diverter pivotally attached to said cover;
    a biasing member between said cover and said diverter; and
    a seal attached to said diverter, wherein said seal comprises:
        an inner lip that extends around a perimeter of said diverter and is supported thereby to contact said housing; and
        an outer lip that is parallel with said inner lip and cantilevered therefrom.

2. The valve of claim 1 wherein at least a portion of said cover is transparent to permit viewing of at least a portion of said flapper assembly within said housing when said cover is attached to said housing.

3. The valve of claim 2 wherein said cover is fabricated from a clear polymeric material.

4. The valve of claim 1 wherein at least a portion of said housing is transparent to permit viewing of said flapper assembly within the housing when said cover is attached thereto.

5. The valve of claim 1 wherein said housing contains two ports that are coaxially aligned on opposing sides of said central area.

6. The valve of claim 1 wherein said housing has two ports therein wherein one port lies along a first flow axis and the other port lies along a second flow axis that intersects said first flow axis.

7. The valve of claim 1 wherein said housing has a first port and a second port that is coaxially aligned with said first port along a first flow axis and wherein said housing further comprises a third port that lies along a second flow axis that intersects said first flow axis.

8. The valve of claim 1 wherein said seal further comprises a central portion sized to be received in a cavity in said diverter and wherein said central portion of said seal is retained within said cavity in said diverter by a seal retainer attached to said diverter.

9. The valve of claim 1 further comprising a connector corresponding to each said port and attached to said housing for attaching each said port to a corresponding flow conduit.

10. The valve of claim 1 further comprising a flow indicator on said cover that indicates a flow direction of a fluid flowing through said ports in said housing.

11. The valve of claim 1, wherein said first flow axis is not substantially coaxial with said second flow axis.

12. The valve of claim 1, wherein said first flow axis is perpendicular to said second flow axis.

13. A valve comprising:

a housing defining a central area and having at least two flow ports therethrough; and a cover having a flapper assembly pivotally attached thereto, said cover being removably attachable to said housing in a plurality of orientations to selectively orient said flapper assembly adjacent any one of said ports such that fluid is permitted to flow into said central area of said housing through said adjacent port and said flapper assembly prevents said fluid from flowing out of said central area through said adjacent port, wherein said flapper assembly comprises:

a diverter pivotally attached to said cover, said diverter having at least one recessed retainer cavity;

a spring between said cover and said diverter biasing said diverter into engagement with said housing; and a seal attached to said diverter, wherein said seal further comprises a central portion sized to be received in a cavity in said diverter and wherein said central portion of said seal is retained within said cavity in said diverter by a seal retainer attached to said diverter, said seal retainer having a boss corresponding to each said retainer cavity and protruding from said seal retainer to be received in said corresponding retainer cavity.

14. A valve, comprising:

a housing defining a central area and having at least two flow ports therethrough; and a cover having a flapper assembly pivotally attached thereto said cover being removably attachable to said housing in a plurality of orientations to selectively orient said flapper assembly adjacent any one of said ports such that fluid is permitted to flow into said central area of said housing through said adjacent port and said flapper assembly prevents said fluid from flowing out of said central area through said adjacent port, wherein said flapper assembly comprises:

a diverter pivotally attached to said cover having at least one recessed retainer cavity, said diverter being fabricated from a polymeric material;

a spring between said cover and said diverter biasing said diverter into engagement with said housing; and a seal attached to said diverter, wherein said seal further comprises a central portion sized to be received in a cavity in said diverter and wherein said central portion of said seal is retained within said cavity in said diverter by a seal retainer attached to said diverter and a boss corresponding to each said retainer cavity and protruding from said seal retainer to be received in said corresponding retainer cavity, wherein said seal retainer is fabricated from a polymeric material and each said boss is retained within said corresponding retainer cavity by ultrasonic welding.

15. A check valve, comprising:

a housing defining a central area and having a first port therein that lies along a first flow axis, said first port attachable to a first fluid-receiving conduit and a second port therein that lies along a second flow axis that is substantially coaxial with said first flow axis and is attachable to a second fluid-receiving conduit; and a transparent cover having a flapper assembly pivotally attached thereto, said cover being attachable to said housing in a plurality of positions to selectively orient said flapper assembly adjacent either of said first and second ports such that a fluid is permitted to flow through said adjacent port into said central area and said flapper assembly prevents said fluid from flowing out of said central area through said adjacent port, wherein said flapper assembly further comprises:

a diverter pivotally attached to said cover;

a spring between said cover and said diverter biasing said diverter into engagement with said housing; and a seal attached to said diverter and having an inner lip that extends around a perimeter of said diverter and is supported thereby for sealing contact with said housing, and an outer lip that is parallel with said inner lip and cantilevered therefrom for sealing contact with said housing.

16. A check valve, comprising:

a housing defining a central area and having a first port therethrough that lies along a first flow axis and is attachable to a first fluid-receiving conduit and a second port therethrough that lies along a second flow axis that is substantially perpendicular to said first flow axis and is attachable to a second fluid-receiving conduit;

a transparent cover having a flapper assembly pivotally attached thereto, said cover being removably attachable to said housing in a plurality of positions to selectively orient said flapper assembly adjacent any one of said first and second ports such that a fluid is permitted to flow through said adjacent port into said central area and said flapper assembly preventing said fluid from flowing out of said central area through said adjacent port, wherein said flapper further comprises:

a diverter pivotally attached to said cover;

a spring between said cover and said diverter biasing said diverter into engagement with said housing; and a seal attached to said diverter and having an inner lip that extends around a perimeter of said diverter and is supported thereby for sealing contact with said housing and an outer lip that is parallel with said inner lip and cantilevered therefrom for sealing contact with said housing.

17. A check valve, comprising:

a housing defining a central area and having a first port therethrough that lies along a first flow axis, said first port being attachable to a first fluid-receiving conduit, said housing further having a second port therethrough that is coaxially aligned on said first flow axis, said second port being attachable to a second fluid-receiving conduit, said housing further having a third port that lies along a second flow axis that is substantially perpendicular to said first flow axis and is attachable to a third fluid-receiving conduit; and a transparent cover having a flapper assembly pivotally attached thereto, said cover attachable to said housing in a plurality of positions to selectively orient said flapper assembly adjacent any one of said first, second and third ports such that fluid is permitted to flow into said central area through said adjacent port and said flapper assembly prevents said fluid from flowing out of said central area through said adjacent port, said flapper assembly comprising:

a diverter pivotally attached to said cover;

a spring between said cover and said diverter biasing said diverter into engagement with said housing; and a seal attached to said diverter and having an inner lip that extends around a perimeter of said diverter and is supported thereby for sealing contact with said housing and an outer lip that is parallel to said inner lip and is cantilevered therefrom for sealing contact with said housing.

18. A check valve, comprising:

a housing defining a central area and having four ports therein, said housing further comprising:

a first port therein that lies along a first flow axis;

a second port therein that is coaxially aligned on said first flow axis;

a third port therein that lies along a second flow axis that is perpendicular to said first flow axis; and a fourth port therein that is coaxially aligned on said second flow axis; and a transparent cover having a flapper assembly pivotally attached thereto, said cover attachable to said housing in a plurality of positions to selectively orient said flapper assembly adjacent any one of said ports such that said flapper assembly permits fluid to flow into said central area through said adjacent port and prevents said fluid from flowing from said central area through said adjacent port;

wherein said flapper assembly includes a diverter pivotally attached to said cover;

a spring between said cover and said diverter for biasing said diverter into engagement with said housing; and a seal attached to said diverter for achieving a fluid-tight seal between said housing and said diverter when said diverter is biased into engagement therewith, wherein said seal includes an inner lip that extends around a perimeter of said diverter and is supported thereby for sealing contact with said housing, an inner lip that is parallel to said inner lip and is cantilevered therefrom for sealing contact with said housing.

19. The check valve of claim 18 wherein said flapper assembly comprises:

a diverter pivotally attached to said cover;

a spring between said cover and said diverter for biasing said diverter into engagement with said housing; and a seal attached to said diverter for achieving a fluid-tight seal between said housing and said diverter when said diverter is biased into engagement therewith.

20. A check valve, comprising:

a housing defining a central area and having four ports therein; and a transparent cover having a flapper assembly pivotally attached thereto, said cover attachable to said housing in a plurality of positions to selectively orient said flapper assembly adjacent any one of said ports such that said flapper assembly permits fluid to flow into said central area through said adjacent port and prevents said fluid from flowing from said central area through said adjacent port, wherein said flapper comprises:

a diverter pivotally attached to said cover;

a biasing member between said cover and said diverter; and a seal attached to said diverter and having an inner lip that extends around a perimeter of said diverter and is supported thereby for sealing contact with said housing; and an outer lip that is parallel to said inner lip and is cantilevered therefrom.

* * * * *